US008514089B2

(12) United States Patent
Huang

(10) Patent No.: US 8,514,089 B2
(45) Date of Patent: Aug. 20, 2013

(54) TEMPERATURE MONITORING CIRCUIT

(75) Inventor: Yong-Zhao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 281 days.

(21) Appl. No.: 13/012,825

(22) Filed: Jan. 25, 2011

(65) Prior Publication Data

US 2012/0161972 A1 Jun. 28, 2012

(30) Foreign Application Priority Data

Dec. 28, 2010 (CN) .......................... 2010 1 0609815

(51) Int. Cl.
G08B 17/00 (2006.01)
G08B 1/00 (2006.01)
G08B 17/10 (2006.01)
G08B 23/00 (2006.01)
G08B 1/08 (2006.01)
H03H 5/10 (2006.01)
H03H 1/00 (2006.01)
G01K 7/00 (2006.01)

(52) U.S. Cl.
USPC ........... 340/584; 340/531; 340/589; 340/628; 340/500; 340/533; 340/630; 323/366; 323/369; 374/183

(58) Field of Classification Search
USPC ............... 340/584, 511, 514, 577, 587, 628, 340/630, 500, 505, 506, 825.21, 825.54; 324/720, 105, 721; 361/103, 106, 100, 93.8; 307/116, 117, 127, 126
See application file for complete search history.

(56) References Cited

U.S. PATENT DOCUMENTS

| 4,160,934 | A  | * | 7/1979  | Kirsch ........................... 315/307 |
| 4,223,303 | A  | * | 9/1980  | Albinger, Jr. .................. 340/531 |
| 5,254,975 | A  | * | 10/1993 | Torikoshi ....................... 340/589 |
| 5,841,204 | A  | * | 11/1998 | English ......................... 307/117 |
| 2002/0179725 | A1 | * | 12/2002 | Shearer ......................... 236/78 R |
| 2006/0289461 | A1 | * | 12/2006 | Kojima et al. ................. 219/497 |
| 2007/0271935 | A1 | * | 11/2007 | Robinson ........................ 62/150 |
| 2008/0012802 | A1 | * | 1/2008  | Lin ................................ 345/82 |
| 2008/0100310 | A1 | * | 5/2008  | Song et al. .................... 324/713 |
| 2010/0193503 | A1 | * | 8/2010  | Kim et al. ..................... 219/494 |

* cited by examiner

Primary Examiner — Jennifer Mehmood
Assistant Examiner — Mirza Alam
(74) Attorney, Agent, or Firm — Altis Law Group, Inc.

(57) ABSTRACT

A temperature monitoring circuit includes a negative temperature coefficient (NTC) resistor, a zener diode, an alarm, a silicon controlled rectifier. A first terminal of the NTC resistor is connected to a power supply through a first resistor. A second terminal of the NTC resistor is grounded. A cathode of the zener diode is connected to a node between the NTC resistor and the first resistor. An anode is grounded through a second resistor. A first terminal of the alarm is connected to the cathode of the zener diode, and is grounded through a third and fourth resistors in series. A cathode of the silicon controlled rectifier is connected to the anode of the zener diode. An anode of the silicon controlled rectifier is connected to a second terminal of the alarm. A control terminal of the silicon controlled rectifier is connected to a node between the third and fourth resistors.

7 Claims, 3 Drawing Sheets

TEMPERATURE MONITORING CIRCUIT

BACKGROUND

1. Technical Field

The present disclosure relates to a temperature monitoring circuit.

2. Description of Related Art

During operation of a computer, heat is generated by some of the components and systems, such as the central processing unit and the data storage systems, of the computer. High-speed processing by the data storage systems results in a correspondingly high amount of heat. Thus, cooling of the data storage systems is an important consideration in designing the computer.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
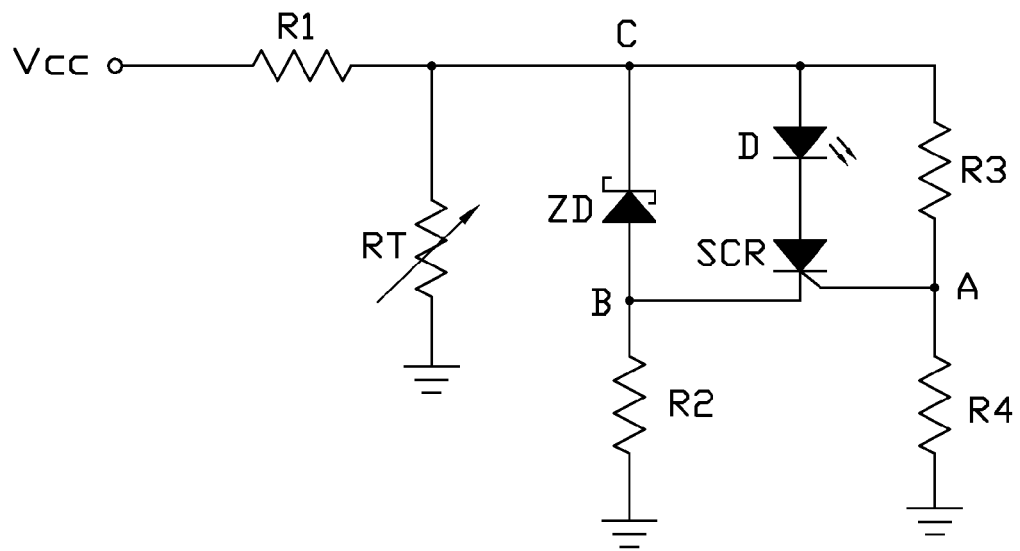
FIG. 1 is a circuit diagram of a first embodiment of a temperature monitoring circuit.

Referring to FIG. 1, a first embodiment of a temperature monitoring circuit includes a negative temperature coefficient (NTC) resistor RT, a zener diode ZD, a light-emitting diode (LED) D, and a silicon controlled rectifier SCR.

A first terminal of the NTC resistor RT is connected to a power supply Vcc through a resistor R1. A second terminal of the NTC resistor RT is grounded. A node between the NTC resistor RT and the resistor R1 is connected to a cathode of the zener diode ZD. The cathode of the zener diode ZD is also connected to an anode of the LED D. An anode of the zener diode ZD is grounded through a resistor R2. The anode of the zener diode ZD is also connected to a cathode of the silicon controlled rectifier SCR. An anode of the silicon controlled rectifier SCR is connected to a cathode of the LED D. The anode of the LED D is grounded through a resistor R3 and a resistor R4 connected in series. A control terminal of the silicon controlled rectifier SCR is connected to a node A between the resistors R3 and R4. A node between the anode of the zener diode ZD and the resistor R2 is marked as B. A node between the cathode of the zener diode ZD and the resistor R1 is marked as C.

According to the characteristic of the silicon controlled rectifier SCR, when a voltage at the control terminal is higher than a voltage at the cathode of the silicon controlled rectifier SCR. In other words, when a voltage VA at the node A is higher than a voltage VB at the node B, the silicon controlled rectifier SCR is turned on.

In the temperature monitoring circuit, the voltage VA, the voltage VB, and a voltage VC at the node C satisfy the following equations:

$$VA=VC*R4/(R4+R3);$$

$$VB=VC-VZD;$$

$$VC=Vcc*RT/(R1+RT)=Vcc-Vcc*R1/(R1+RT);$$

Where VZD stands for a voltage between the anode and the cathode of the zener diode ZD, and R1, R3, and R4 stand for resistances of the resistors R1, R3, and R4 respectively, as a result, when $VC*R4/(R4+R3)>VC-VZD$, in other words, when $VC<VZD*(1+R4/R3)$, the silicon controlled rectifier SCR is turned on.

At a first temperature, the resistances of the NTC resistor RT, the resistors R1, R2, R3, and R4 satisfy the following equation:

$$VC=VZD*(1+R4/R3).$$

When the temperature is lower than the first temperature, the resistance of the NTC resistor RT is high, thus the voltage VC at the node C is high according to the equation of $VC=Vcc-Vcc*R1/(R1+RT)$. As a result, the voltage VC at the node C satisfies the equation of $VC>VZD*(1+R4/R3)$. At this time, the silicon controlled rectifier SCR is turned off. As a result, the LED D does not light.

When the temperature is higher than or equal to the first temperature, the resistance of the NTC resistor RT is low, thus the voltage VC at the node C is low according to the equation of $VC=Vcc-Vcc*R1/(R1+RT)$. As a result, the voltage VC at the node C satisfies the equation of $VC \leqq VZD*(1+R4/R3)$. At this time, the silicon controlled rectifier SCR is turned on. As a result, the LED D lights to alarm users.

Figure 2:
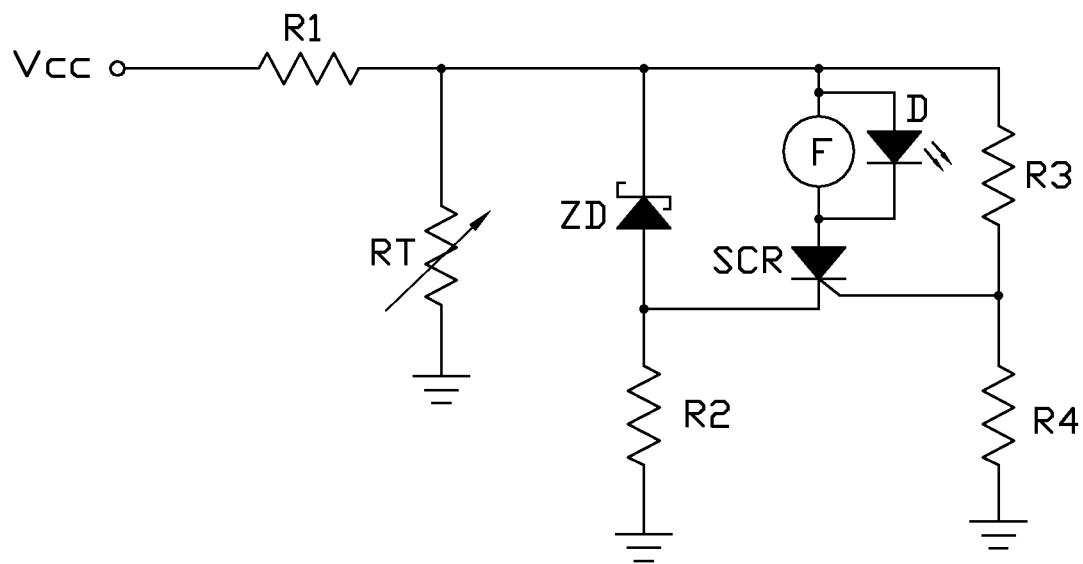
FIG. 2 is circuit diagram of a second embodiment of a temperature monitoring circuit.
Figure 3:
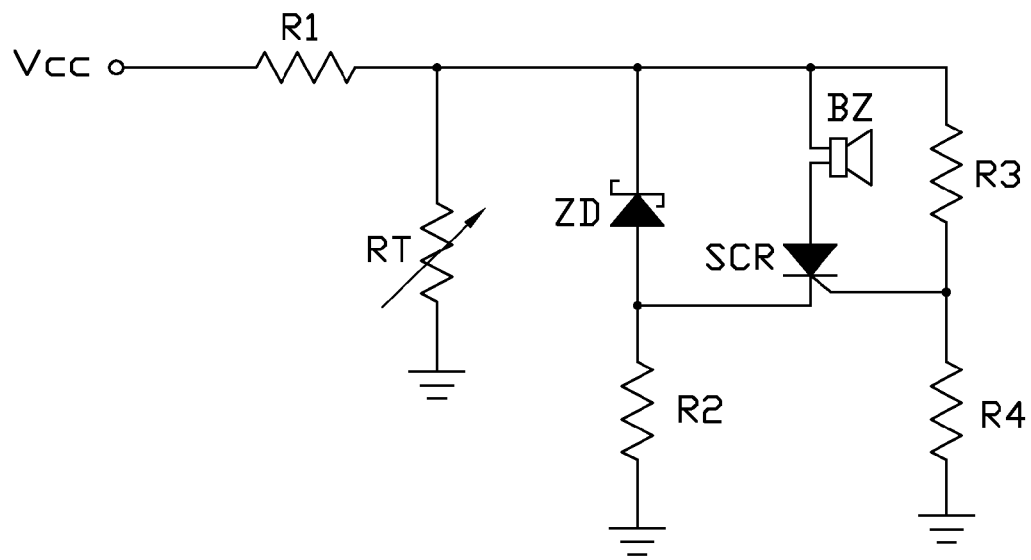
FIG. 3 is circuit diagram of a third embodiment of a temperature monitoring circuit.

Referring to FIG. 2, in a second embodiment, the temperature monitoring circuit further includes a fan F connected to the LED D in parallel. As a result, when the temperature is higher than or equal to the first temperature, the LED D lights, and the fan F is turned on to cool an electronic device, which includes the temperature monitoring circuit. Referring to FIG. 3, in a third embodiment, the LED D can be replaced with another alarm, such as a buzzer.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A temperature monitoring circuit comprising:
    a negative temperature coefficient (NTC) resistor, wherein a first terminal of the NTC resistor is connected to a power supply through a first resistor, a second terminal of the NTC is grounded;

a zener diode, wherein a cathode of the zener diode is connected to a node between the NTC resistor and the first resistor, an anode of the zener diode is grounded through a second resistor;

an alarm, wherein a first terminal of the alarm is connected to the cathode of the zener diode, and is grounded through a third resistor and a fourth resistor connected in series; and a silicon controlled rectifier, wherein a cathode of the silicon controlled rectifier is connected to the anode of the zener diode, an anode of the silicon controlled rectifier is connected to a second terminal of the alarm, a control terminal of the silicon controlled rectifier is connected to a node between the third resistor and the fourth resistor.

2. The temperature monitoring circuit of claim 1, wherein the alarm is a light-emitting diode, an anode of the light-emitting diode is the first terminal of the alarm, a cathode of the light-emitting diode is the second terminal of the alarm.

3. The temperature monitoring circuit of claim 1, wherein the alarm is a buzzer, a first terminal of the buzzer is the first terminal of the alarm, a second terminal of the buzzer is the second terminal of the alarm.

4. A temperature monitoring circuit comprising:

a negative temperature coefficient (NTC) resistor, wherein a first terminal of the NTC resistor is connected to a power supply through a first resistor, a second terminal of the NTC resistor is grounded;

a zener diode, wherein a cathode of the zener diode is connected to a node between the NTC resistor and the first resistor, an anode of the zener diode is grounded through a second resistor;

a fan, wherein a first terminal of the fan is grounded through a third resistor and a fourth resistor connected in series; and a silicon controlled rectifier, wherein a cathode of the silicon controlled rectifier is connected to the anode of the zener diode, an anode of the silicon controlled rectifier is connected to a second terminal of the fan, a control terminal of the silicon controlled rectifier is connected to a node between the third resistor and the fourth resistor.

5. The temperature monitoring circuit of claim 4, further comprising an alarm connected to the fan in parallel.

6. The temperature monitoring circuit of claim 5, wherein the alarm is a light-emitting diode, an anode of the light-emitting diode is connected to the first terminal of the fan, a cathode of the light-emitting diode is connected to the second terminal of the fan.

7. The temperature monitoring circuit of claim 5, wherein the alarm is a buzzer.

\* \* \* \* \*